United States Patent [19]

Philip

[11] 4,101,737

[45] Jul. 18, 1978

[54] CONTROL ARRANGEMENT IN A TIME-SPACE-TIME (T-S-T) TIME DIVISION MULTIPLE (T.D.M.) TELECOMMUNICATION SWITCHING SYSTEM

[75] Inventor: Alexander Schroder Philip, Liverpool, England

[73] Assignee: Plessey Handel und Investments AG, Zug, Switzerland

[21] Appl. No.: 699,449

[22] Filed: Jun. 24, 1976

[30] Foreign Application Priority Data

Jun. 26, 1975 [GB] United Kingdom ............... 27075/75

[51] Int. Cl.² .............................................. H04J 3/00
[52] U.S. Cl. ........................... 179/15 AT; 179/15 AQ
[58] Field of Search ...................... 179/15 AQ, 15 AT

[56] References Cited

U.S. PATENT DOCUMENTS

| | | | |
|---|---|---|---|
| 3,773,978 | 11/1973 | LeRoy ............................ | 179/15 AQ |
| 3,864,525 | 2/1975 | Edstrom et al. ................ | 179/15 AQ |
| 3,878,338 | 4/1975 | Hardy ............................. | 179/15 AT |
| 3,906,159 | 9/1975 | Lutz ................................ | 179/15 AQ |
| 3,906,164 | 9/1975 | Philip et al. ................. | 179/15 AQ X |
| 3,927,267 | 12/1975 | Voyer et al. .................... | 179/15 AT |
| 3,956,593 | 5/1976 | Collins et al. ................. | 179/15 AQ |
| 4,001,781 | 1/1977 | Charransol et al. ......... | 179/186 F X |
| 4,005,272 | 1/1977 | Collins et al. ................. | 179/15 AQ |
| 4,038,497 | 7/1977 | Collins et al. .................. | 179/15 AT |

*Primary Examiner*—Thomas W. Brown
*Attorney, Agent, or Firm*—Fleit & Jacobson

[57] ABSTRACT

Time-switch control-store arrangements for use in a digital switching system of a time division multiplex telecommunication system of the type defined in which the time-switch control-store arrangements serve corresponding receive and transmit time-switches of a superhighway group and a single connection control-word in the time-switch control-store is employed twice in a superhighway frame, once for reading the receive time-switch information character in respect of one simplex path and once for writing the corresponding transmit time-switch information character in the same m-channel multiplex in respect of another simple path, the phase difference between the said reading and writing being $F/2 + D$ where F is the total number of cross-office time-slots in a superhighway frame, and D is the finite propagation delay incurred in the transmission of an information character over a simplex path.

8 Claims, 3 Drawing Figures

CONTROL ARRANGEMENT IN A TIME-SPACE-TIME (T-S-T) TIME DIVISION MULTIPLE (T.D.M.) TELECOMMUNICATION SWITCHING SYSTEM

The present invention relates to telecommunication switching systems and is more particularly concerned with time switching arrangements for use in digital switching systems.

Digital switching systems are used, for example, in the telecommunication art for the switching of time division multiplex telephone-calls involving pulse code modulated (p.c.m.) channels. Such digital switching systems may also be used in data switching arrangements using time division multiplex (t.d.m.) information transmission involving say telegraph calls or for the handling of t.d.m. data messages between remote users of computer equipment.

The digital networks employed in digital switching systems of this type employ so-called space-switching stages and time-switching stages. The space-switching stage is a co-ordinate matrix arrangement having electronic co-ordinate switches, whereas the time-switching stage employs delay lines, shift registers or random access memories.

In one example of a digital switching system involving time-space-time switching structure, the incoming time-division-multiplexed signals received at the digital switching exchange are segregated into their separate channels. Each receive time-division-multiplex (t.d.m.) path is provided with a dedicated receive storage-arrangement having one location for each receive t.d.m. channel. Similarly each exchange transmit t.d.m. path is provided with a transmit storage-arrangement having one location for each transmit t.d.m. channel. A number of receive storage devices, typically of the order of 8 or 16, are served by a single receive superhighway while the corresponding transmit storage devices are served by a transmit superhighway. The superhighways carry information characters in parallel and may be operated for example at (or a multiple of) the t.d.m. bit rate. The receive superhighways and the transmit superhighways are interconnected by an electronic switching-network whose crosspoints are operated, on a t.d.m. basis, in accordance with the operating bit-rate of the superhighways. The receive storage-arrangements and the transmit storage-arrangements provide the time-switching function while the electronic switching network interconnecting the storage arrangement provides the space-switching function.

A digital switching system of a time division multiplex telecommunication system of the type to which this invention is applicable includes n m-channel multiplex receive-highways and n corresponding m-channel multiplex transmit-highways, each of the receive and transmit-highways including a time-switch for storing information characters. The receive and transmit-highways are arranged in superhighway groups, each group being connected to individual receive and transmit superhighways respectively. The superhighways are interconnected by a space-switching network in which any duplex connection path through the space-switching network, for conveying information characters through the digital switching system, comprises two separate simplex connection-paths which are separated by cross-office time-slots which are F/2 apart, where F is the total number of cross-office time-slots in a superhighway frame.

This invention is concerned with the time-switch control-store arrrangements for effecting the reading of information characters from the receive time-switch, and writing information characters into the transmit time-switch during cross-office time-slots in a digital system of a time-division-multiplex telecommunications system of the type defined in the above paragraph.

An object of the present invention is to provide time-switch control arrangements which makes most efficient time-shared use of hardware while retaining practical store cycle-times.

According to the present invention there are provided time-switch control store arrangements for use in a digital switching system of a time-division-multiplex telecommunications system of the type defined in which the time-switch control-store arrangements serve corresponding receive and transmit time-switches of a superhighway group and a single connection control-word in the time-switch control-store is employed twice in a superhighway frame, once for reading the receive time-switch information character in respect of one simplex path and once for writing the corresponding transmit time-switch information character in the same m-channel multiplex in respect of another simplex path, the phase difference between the said reading and writing being $F/2 + D$ where $F$ is the total number of cross-office time-slots in a superhighway frame, and D is the finite propagation delay incurred in the transmission of an information character over a simplex path.

The invention will be better understood from the following description of two embodiments which should be read in conjunction with the drawings accompanying the provisional specification.

Figure 1:
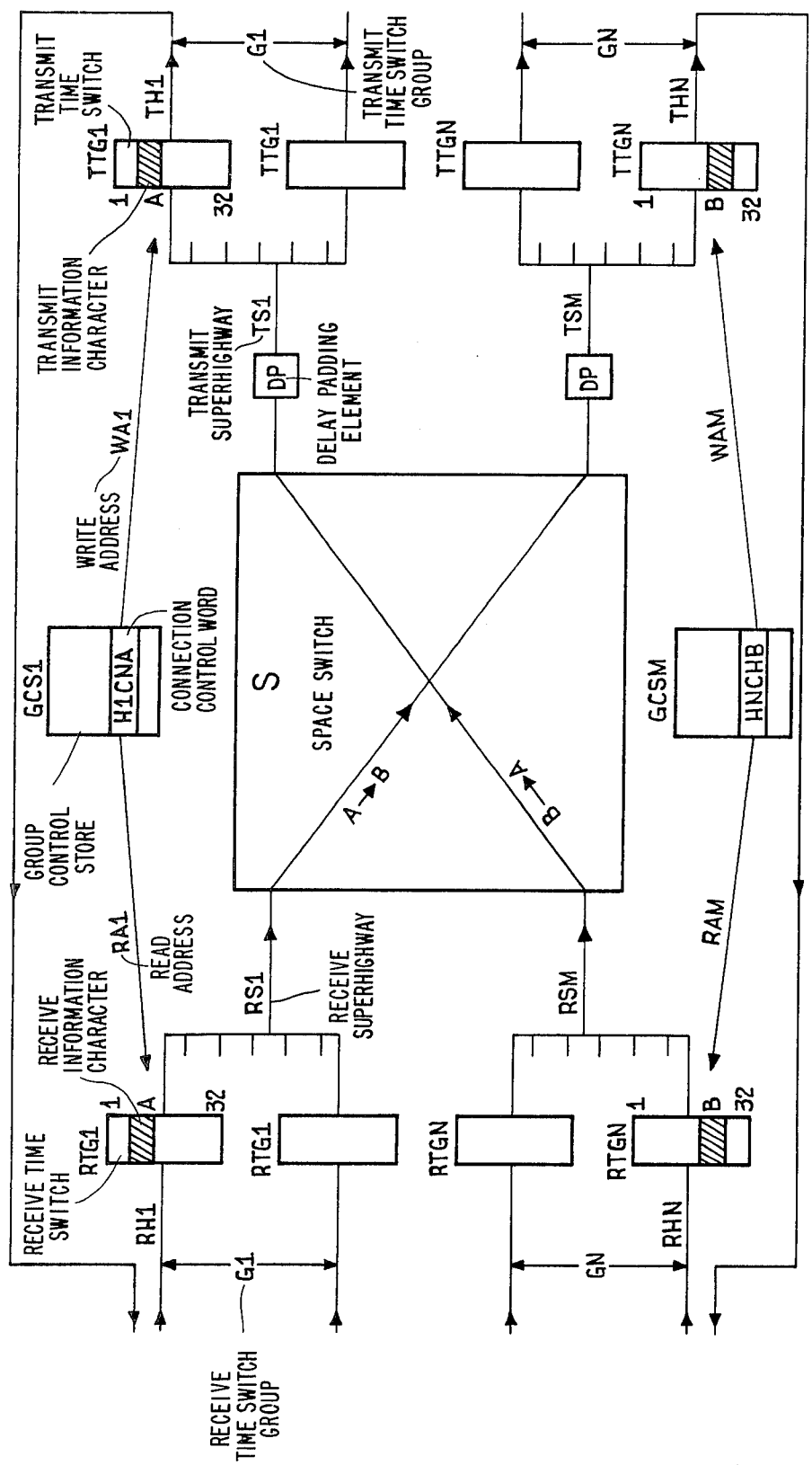
FIG. 1 Illustrates a schematic diagram of a portion of a digital switching system incorporating the invention.

Referring to FIG. 1, it will be seen that there are a number of receive time-division-multiplex (t.d.m.) highways RH1-RHN and a corresponding number of transmit time-division-multiplex highways TH1-THN. Each such highway accommodates, in a time-division-multiplex (t.d.m.) frame, 32 eight-bit channels, 30 of which are used for transmission of speech, (each channel carrying an eight-bit pulse-code-modulated (p.c.m.) sample) one for signalling and one for synchronising purposes.

Each t.d.m. highway incorporates a time-switch (receive time-switches RTG1-RTGN and transmit time-switches TTG1-TTGN) for storing up to 32-channel p.c.m. information characters. The highways are arranged in superhighway groups (G1-GN) of up to sixteen highways in each group, and each group is connected to a superhighway (receive superhighways RS1-RSM and transmit superhighways TS1-TSM) on which the 32-channel t.d.m. highways are supermultiplexed. A 512 time-slot superhighway frame is provided for cross-office switching purposes.

The receive superhighways (RS1-RSM) and transmit superhighways (TS1-TSM) are interconnected by a space-switching network S which comprises several stages of co-ordinate switches (not shown). This network S shows two simplex connection-paths (A to B and B to A) of a duplex connection-path between two t.d.m. highways through the switching system. The starting points for transmission of information characters over these two paths are separated by half a superhighway frame (F/2 (where F is the total number of cross-office time slots in a superhighway frame).

The reading of information characters from the receive transmit time-switches for transmission over a simplex-path (A to B) and the writing of information characters into the transmit time-switches from a simplex-path (B to A) are under the control of the group control-stores GCS1 to GCSM these being provided on a basis of one for each pair of corresponding superhighway groups.

The group control-stores store the addresses, or connection-control-words, of the information characters stored in the time-switches and each such connection-control-word e.g. 9 bits comprises two-parts e.g. 4 bits and 5 bits. The first part is relevant to selecting one-out-of-sixteen time-switches, while the second-part is relevant to selecting one-out-of-32 locations in the selected time-switch.

As a group-control-store is common to both the receive superhighway group and a corresponding transmit superhighway group it is necessary to employ the connection-control-word twice in respect of different simplex paths, on any one call, for reading and writing a particular channel in the same 32-channel multiplex.

For example, channel A in the receive time-switch of t.d.m.-highway RH1 is read by application of a connection-control-word by way of path RA1 to the receive time-switch on receive t.d.m.-highway RH1 from location H1CNA in the group control-store GCS1. Similarly, the writing into channel A in the transmit time-switch of t.d.m.-highway TS1 is effected by the application of the same connection-control-word by way of path WA1 to the transmit time-switch on transmit t.d.m.-highway TH1 from location H1CNA in the group control-store GCS1.

The phase separation between the reading and writing functions is (F/2) + D (where F is equal to the total number of cross-office time-slots in a superhighway frame, and D represents the finite propagation delay incurred in the transmission of an information character over a simplex-path). The delay portion F/2 of this phase separation, is formed as a result of the previously-mentioned starting points of the two simplex-paths being separated by F/2.

It should be noted that the device DP in each of the transmit superhighways TS1 to TSM is a delay element which is used in certain circumstances (to be discussed in further detail later) for padding the propagation delay to be an odd number of cross-office time-slots.

Figure 2:
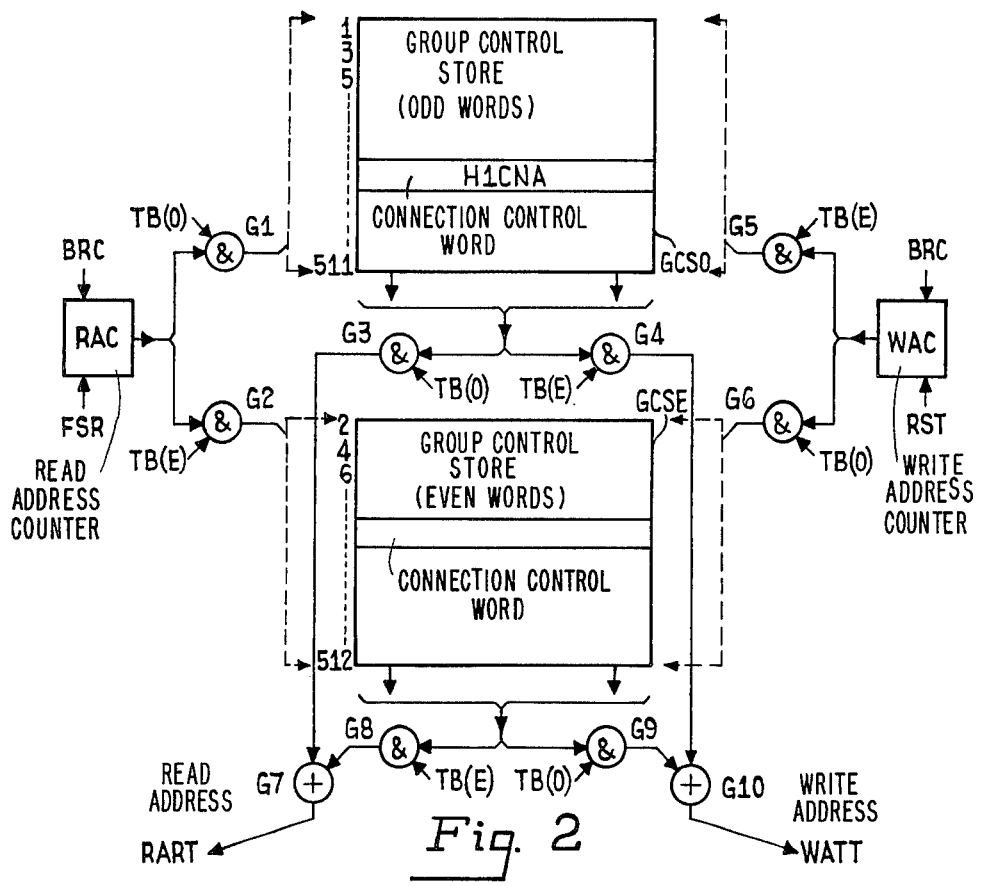
FIG. 2 Illustrates one method of arranging the connection-control-store.
Figure 3:
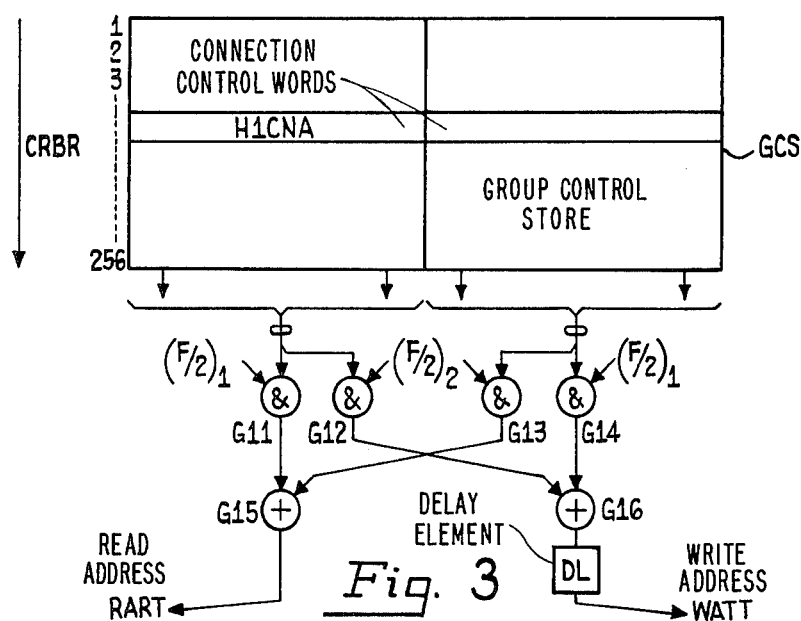
FIG. 3 Illustrates another method of arranging the connection-control-store.

Before discussing the two methods in which the group-control-store is organised as illustrated in a combination of both schematic and logic form in FIG. 2 and FIG. 3, it should be understood that the symbols which are a circle including an ampersand represent logic-gates performing AND functions, while those symbols which are a circle including a plus (+) sign represent logic-gates performing OR functions.

Referring now to FIG. 2, which illustrates one method of organising the group-control-stores, it should be understood that the store is a 512-word store with each word containing one time-switch address, which is also referred to herein as a connection-control-word. The allocation of the words to cross-office time-slots is such that the store is divided into two separate sections, the top section GCSO being used for storing connection-control-words for cross-office time-slots of an odd nomenclature, whereas the bottom section GCSE being used for storing connection-control-words for cross-office time-slots of an even nomenclature.

The propogation delay D is now arranged to be equivalent to an odd number of cross-office time-slots by suitable adjustment of the delay padding-elements DP (see FIG. 1) or alternatively by the introduction of a single-bit of retiming in the address staticiser (not shown) which is located between the connection-control-store and the transmit time-switch stores. The phase separation between the reading and writing functions F/2 + D will therefore always be equivalent to an odd number of cross-office time-slots.

Now, if at the beginning of each superhighway frame, the read address-counter RAC and the write address-counter WAC, are reset by signal FSR to the beginning of the frame, and by signal RST to F/2 + D of the same frame, where D is odd, respectively, then as both counters are stepped at the superhighway bit-rate BRC, by suitable gating, gates G1 and G6 with G2 and G5, the address multiplexor (shown symbolically by chain-dotted lines with arrowed extremities) is arranged to point to connection-control-words in different sections of the store simultaneously.

Since the counters are always in opposite parity states, and as the counters are progressively stepped, the read-addresses RART (connection-control-words) for the receive time-switches are taken from the control-store during odd TB(O) and even TB(E) cross-office time-slots by way of gates G3 with G7 and G8 with G7 respectively. The write-addresses WATT (connection-control-words) for the transmit time-switches are taken from the control-store during odd TB(O) and even TB(E) cross-office time-slots by way of gates G9 with G10 and G4 with G10 respectively during the same superhighway frame in which the receive time-switch addresses are obtained. Consequently the time-switch addresses e.g. H1CNA are used twice in any one superhighway frame, once in respect of reading receive time-switch information characters, and once for writing transmit time-switch information characters.

Referring now to FIG. 3, which illustrates an alternative method of organising the group control-store GCS. In this arrangement, there is not the usual allocation of a connection-control-word to each of the 512 cross-office time-slots. Instead 256 double-length words are provided, each double-length word containing a first connection-control-word (left-hand side of the store) and a second connection-control-word (right-hand side of the store). Thus two separate connection-control-word blocks are formed.

A cyclic counter (not shown) is employed in the addressing arrangements to give a cyclic reading of the double-length words at the superhighway bit-rate as indicated by the arrow designated CRBR. Accordingly, during a 512 cross-office time-slot superhighway frame, the receive time-switch addresses RART are obtained from the left-hand storage block in the store (first connection-control-words) by way of gates G11 with G15 and then from the right-hand storage block in the store, (second connection-control-words) by way of gates G13 with G15. During the same superhighway frame, transmit time-switch addresses WATT (connection-control-words) are obtained from the right-hand storage block in the store (second connection-control-words) by way of gates G14 and G16 and then from the left-hand storage block in the store (first connection-control-words) by way of gates G12 with G16.

It will be apparent, therefore, that the complete store is read from top to bottom during each half frame (F/2)1 and (F/2)2 and each double-length word is available at the output during a complete cross-office time-slot.

The phase separation of F/2 between the reading of the receive and transmit time-switch addresses from the group control-store blocks results in a delay of F/2 between the corresponding read and write time-switch addresses. This is made up to F/2 + D by incorporating a delay element DL on the output of the block currently supplying the transmit time-switch write addresses (connection-control-words). The delay element is equivalent to the propagation delay D and is switched from one connection-control-word block to another at half-frame rate by the same changeover gating as directs the currently relevant connection-control-word block to the receive or transmit time-switch group.

What we claim is:

1. A digital switching system of a time division multiplex telecommunications system which includes; a plurality (n) of m-channel multiplex receive-highways; a plurality (n) of m-channel multiplex transmit-highways; each of the receive-highways and transmit-highways including a separate time-switch for storing information characters; and, the receive-highways and transmit-highways are arranged in groups with each group connected to an individual receive-superhighway and transmit-superhighway respectively;

said receive-superhighways being interconnectable with the transmit-superhighways by a space-switching network providing duplex connection paths for the conveyance of information characters; and each said duplex connection path comprises two separate simplex connection paths which are separated by time-slots which are (F/2) apart, where F is the number of time-slots in each superhighway frame; and, a control arrangement including a separate control-store for the time-switches of each pair of super-highways constituted by a receive-superhighway and a transmit-superhighway, and each control-store includes a plurality of connection control-words and a single connection control-word is employed twice in a superhighway frame, once for controlling the reading of an information character from a time switch in a receive highway for conveyance over one simplex path and once for controlling the writing of the information character being conveyed over another simplex path into a time-switch in a transmit highway; and, each said control-store has $n \times m$ storage locations for storing connection control words and is divided into two separate sections and the connection control-words for time-slots of an odd nomenclature are stored in one of the sections and connection control words for time-slots of an even nomenclature are stored in the other of the sections, and each control store includes an addressing means including;

a first counting-device for selecting connection control-words from the control-store to effect reading of information characters from the receive time switches; and, a second counting-device for selecting connection control-words from the control-store to effect writing of information characters into the transmit time switches; and, the first and second counting devices are operated in such manner that a phase difference F/2 + D, where F is the number of time-slots in a superhighway frame, and D is the propagation delay in the transmission of an information character over a simplex path, between the first and second counting devices of an odd number of time-slots is maintained by ensuring that the propagation delay D is an odd number of time-slots, by the said addressing means always addressing the separate sections of the connections control store concurrently.

2. The digital switching system as claimed in claim 1 in which;

an adjustable delay padding element is inserted in each transmit superhighway and the adjustment of said element is such that the propagation delay D is equivalent to an odd number of bit periods.

3. The digital switching system as claimed in claim 2 in which;

the first counting device is a read address counter and the second counting device is a write address counter and, at the beginning of each superhighway frame, the read address counter is reset to correspond with the beginning of the superhighway frame while the write address counter is reset to correspond to F/2 + D of the same superhighway frame.

4. The digital switching system as claimed in claim 3 in which;

the read address counter and the write address counter are progressively driven at the superhighway bit-rate simultaneously, and the outputs of the read and write counters are applied to means which select connection control-words from the two separate sections of the control store concurrently.

5. The digital switching system as claimed in claim 4 in which;

during each superhighway frame, the time-switch read addresses (connection control-words) are obtained from the said one section of the control-store during odd time-slots and from the said other section of the control-store during even time-slots, whereas;

the time-switch write-addresses (connection control words) are obtained from the said one section of the control-store during even time-slots and from the said other section of the control-store during odd time-slots.

6. A digital switching system of a time division multiplex telecommunication system which includes;

a plurality (n) of m-channel multiplex receive-highways;

a plurality (n) of m-channel multiplex transmit-highways;

each of the receive-highways and transmit-highways including a separate time-switch for storing information characters; and, the receive-highways and transmit-highways are arranged in groups with each group connected to an individual receive-superhighway or transmit-superhighway respectively;

said receive-superhighways being interconnectable with the transmit-superhighways by a space-switching network providing duplex connection paths for the conveyance of information characters; and, each said duplex connection path comprises two separate simplex connection paths which are separated by time-slots which are F/2 apart, where F is the number of time-slots in each superhighway frame; and, a control arrangement including a separate control-store for the time-switches of each pair of superhighways constituted by a receive-superhighway and a transmit-superhighway; and, each control-store includes a plurality of connection control-words and a single connection control-word is employed twice in a superhighway frame, once for controlling the reading of an information character from a time switch in a receive-highway for conveyance over one simplex path and once for controlling the writing of the information character being conveyed over another simplex path into a time-switch in a transmit-highway; and, each control-store has $n \times m/2$ storage locations each of which includes first and second connection control-words, corresponding first and second connection control-words being arranged in separate storage blocks respectively; and, the first connection control-words followed by the second connection control-words, to effect the reading of information characters from the receive time-switches, are successively obtained, from the control-store at the superhighway bit-rate and within a superhighway frame, and during the same superhighway frame the second connection control-words followed by the first connection control-words to effect the writing of information-characters into the transmit time-switches are successively obtained from the control-store at the superhighway bit-rate; and, each control store includes addressing means including a cyclic counting device which selects a double-length connection control-word during each time slot enabling a phase difference of $F/2 + D$ to be maintained between the said reading and writing, where F is the number of time-slots in a superhighway frame, and D is the propagation delay in the transmission of an information character over a simplex path.

7. The digital switching system as claimed in claim 6 in which;

the receive time-switch addresses (connection control-words) are obtained from one storage block during the first half of a superhighway frame and from the other storage block during the second half of the superhighway frame while during the same superhighway frame the write time-switch addresses (connection control-words) are obtained from the said other storage block during the first half of the superhighway frame and from the said one storage block during the second half of the superhighway frame.

8. The digital switching system as claimed in claim 7, in which;

there is a half-frame separation between the connection control-words concurrently obtained from the control-stores and this half-frame separation is incremented by a delay, equivalent to the propagation delay D, and effected by delay means at the output of the connection control-words block from which connection control-words for writing information characters into the transmit time-switches are obtained.

* * * * *